(12) United States Patent
Wendel

(10) Patent No.: US 12,470,836 B2
(45) Date of Patent: Nov. 11, 2025

(54) SYSTEMS AND METHODS FOR DOWNSAMPLING IMAGES

(71) Applicant: Kodiak Robotics, Inc., Mountain View, CA (US)

(72) Inventor: Andreas Wendel, Mountain View, CA (US)

(73) Assignee: Kodiak Robotics, Inc., Mountain View, CA (US)

( * ) Notice: Subject to any disclaimer, the term of this patent is extended or adjusted under 35 U.S.C. 154(b) by 0 days.

(21) Appl. No.: 18/147,588

(22) Filed: Dec. 28, 2022

(65) Prior Publication Data

US 2024/0223915 A1 Jul. 4, 2024

(51) Int. Cl.
*H04N 23/80* (2023.01)
*G06T 3/40* (2024.01)
*G06T 7/50* (2017.01)
*H04N 13/25* (2018.01)

(52) U.S. Cl.
CPC .............. *H04N 23/815* (2023.01); *G06T 3/40* (2013.01); *G06T 7/50* (2017.01); *H04N 13/25* (2018.05); *G06T 2207/30261* (2013.01)

(58) Field of Classification Search
CPC G06T 3/40; G06T 3/4053; G06T 7/50; G06T 2207/30261; H04N 23/815; H04N 23/632; H04N 23/951; H04N 21/4728; H04N 13/25; H04N 2201/325; H04N 2201/3252; H04N 7/0117; H04N 9/318
See application file for complete search history.

(56) References Cited

U.S. PATENT DOCUMENTS

| | | | |
|---|---|---|---|
| 10,733,472 B2 | 8/2020 | Zamfir et al. | |
| 10,735,671 B2* | 8/2020 | Marman | H04N 7/183 |
| 10,757,320 B2* | 8/2020 | Wendel | H04N 23/73 |
| 11,636,685 B1 | 4/2023 | Volta et al. | |
| 2008/0043113 A1* | 2/2008 | Ishii | H04N 7/181 348/E7.086 |
| 2009/0060273 A1 | 3/2009 | Stephan et al. | |
| 2010/0002074 A1* | 1/2010 | Niem | G06T 3/00 348/E13.001 |

(Continued)

FOREIGN PATENT DOCUMENTS

CN 112862732 A 5/2021

*Primary Examiner* — Brian P Yenke
(74) *Attorney, Agent, or Firm* — Fox Rothschild LLP

(57) ABSTRACT

Systems and methods are provided of downsampling an image to a plurality of image resolutions. The method comprises capturing, using a camera, an image depicting an environment within view of the camera, identifying a first section of the image depicting an area of the environment spaced within a first distance range from the camera, identifying a second section of the image depicting an area of the environment spaced within a second distance range from the camera, identifying a third section of the image depicting an area of the environment spaced within a third distance range from the camera, and downsampling the first section of the image to a first image resolution, generating a first processed image, the second section of the image to a second image resolution, generating a second processed image, and the third section of the image to a third image resolution, generating a third processed image.

21 Claims, 6 Drawing Sheets

(56) References Cited

U.S. PATENT DOCUMENTS

| | | | |
|---|---|---|---|
| 2011/0205042 A1* | 8/2011 | Takemura | B60W 30/08 |
| | | | 340/435 |
| 2012/0327189 A1* | 12/2012 | Muramatsu | G06T 7/593 |
| | | | 348/46 |
| 2018/0095531 A1* | 4/2018 | Brown | H04N 21/47 |
| 2019/0004149 A1* | 1/2019 | Mano | G01S 17/89 |
| 2019/0050993 A1* | 2/2019 | Jang | G06V 10/82 |
| 2019/0158732 A1* | 5/2019 | Shimauchi | H04N 23/815 |
| 2019/0208111 A1* | 7/2019 | Wendel | H04N 23/745 |
| 2021/0174470 A1* | 6/2021 | Stimm | H04N 23/698 |
| 2021/0406679 A1 | 12/2021 | Wen et al. | |
| 2023/0370709 A1* | 11/2023 | Ozone | G06V 10/75 |

\* cited by examiner

300

- 302 Capture, using a camera, an image depicting an environment within view of the camera
- 304 Identify a first section of the image, wherein the first section depicts an area of the environment spaced within a first distance range from the camera
- 306 Identify a second section of the image, wherein the second section depicts an area of the environment spaced within a second distance range from the camera
- 308 Identify a third section of the image, wherein the third section depicts an area of the environment spaced within a third distance range from the camera
- 310 Downsample the first section of the image to a first image resolution, generating a first processed image
- 312 Downsample the second section of the image to a second image resolution, generating a second processed image
- 314 Downsample the third section of the image to a third image resolution, generating a third processed image

FIG. 3

SYSTEMS AND METHODS FOR DOWNSAMPLING IMAGES

BACKGROUND

Field of the Disclosure

Embodiments of the present disclosure relate to image processing for autonomous vehicles.

Description of the Related Art

Autonomous vehicles function by collecting data (e.g., camera images, RADAR, or LiDAR data) and processing this data to determine aspects of the environment surrounding the autonomous vehicles, including the presence of objects within the environment. In general, images having high resolutions contain more information about the environment than do lower resolution images. However, there is a tradeoff between collecting high resolution images and processing those images, as the greater the resolution of the image, the greater the computing resources are needed to process it. For at least these reasons, systems and methods are needed to balance capturing high quality data and processing the data in a time that is reasonable for an autonomous vehicle to navigate its environment.

SUMMARY

According to an object of the present disclosure, a method of downsampling an image to a plurality of image resolutions is provided. The method may comprise capturing, using a camera, an image depicting an environment within view of the camera, identifying a first section of the image, wherein the first section depicts an area of the environment spaced within a first distance range from the camera, identifying a second section of the image, wherein the second section depicts an area of the environment spaced within a second distance range from the camera, identifying a third section of the image, wherein the third section depicts an area of the environment spaced within a third distance range from the camera, and downsampling the first section of the image to a first image resolution, generating a first processed image, the second section of the image to a second image resolution, generating a second processed image, and the third section of the image to a third image resolution, generating a third processed image.

According to various embodiments, the first distance range, the second distance range, and the third distance range do not overlap.

According to various embodiments, the second distance range is closer to the camera than the first distance range, and farther from the camera than the third distance range.

According to various embodiments, the method further comprises generating a distance map of the environment of the image.

According to various embodiments, the generating the distance map is performed using one or more of LiDAR, RADAR, and image analysis.

According to various embodiments, one or more of the following are based on the distance map: the identifying the first section; the identifying the second section; and the identifying the third section.

According to various embodiments, the downsampling is performed using a processor, and the camera comprises the processor.

According to various embodiments, the method further comprises, prior to downsampling the first section of the image, the second section of the image, and the third section of the image, downsampling the image to an image resolution lower than an original image resolution.

According to various embodiments, the second image resolution is greater than one or more of the following: the first image resolution; and the third image resolution.

According to an object of the present disclosure, a system for downsampling an image to a plurality of image resolutions is provided. The system comprises a vehicle, and an imaging module, coupled to the vehicle, the imaging module comprising one or more cameras, configured to capture an image depicting an environment within view of the one or more cameras, and a processor. The processor is configured to identify a first section of the image depicting an area of the environment spaced within a first distance range from the one or more cameras, a second section of the image depicting an area of the environment spaced within a second distance range from the one or more cameras, and a third section of the image depicting an area of the environment spaced within a third distance range from the one or more cameras, and downsample the first section of the image to a first image resolution, generating a first processed image, the second section of the image to a second image resolution, generating a second processed image, and the third section of the image to a third image resolution, generating a third processed image.

According to various embodiments, the first distance range, the second distance range, and the third distance range do not overlap.

According to various embodiments, the second distance range is closer to the one or more cameras than the first distance range, and farther from the one or more cameras than the third distance range.

According to various embodiments, the processor is further configured to generate a distance map of the environment of the image.

According to various embodiments, the generating the distance map is performed using one or more of the following: LiDAR; RADAR; and image analysis.

According to various embodiments, one or more of the following are based on the distance map: the identifying the first section; the identifying the second section; and the identifying the third section.

According to various embodiments, the one or more cameras comprise the processor.

According to various embodiments, the processor is further configured to, prior to downsampling the first section of the image, the second section of the image, and the third section of the image, downsample the image to an image resolution lower than an original image resolution.

According to various embodiments, the second image resolution is greater than one or more of the following: the first image resolution; and the third image resolution.

According to an object of the present disclosure, a system is provided. The system comprises an imaging device including one or more cameras, the imaging device coupled to a vehicle, wherein the one or more cameras are configured to capture an image depicting an environment within view of the one or more cameras. The system further comprises a computing device, including a processor and a memory, coupled to the vehicle, configured to store programming instructions that, when executed by the processor, cause the processor to identify a first section of the image depicting an area of the environment spaced within a first distance range from the one or more cameras, a second section of the image depicting an area of the environment spaced within a second distance range from the one or more cameras, and a third section of the image depicting an area of the environment spaced within a third distance range from the one or more cameras, and downsample the first section of the image to a first image resolution, generating a first processed image, the second section of the image to a second image resolution, generating a second processed image, and the third section of the image to a third image resolution, generating a third processed image.

BRIEF DESCRIPTION OF THE DRAWINGS

FIG. 3 is an example flowchart of a method for generating processed images, according to various embodiments of the present disclosure.

DETAILED DESCRIPTION

Figure 1:
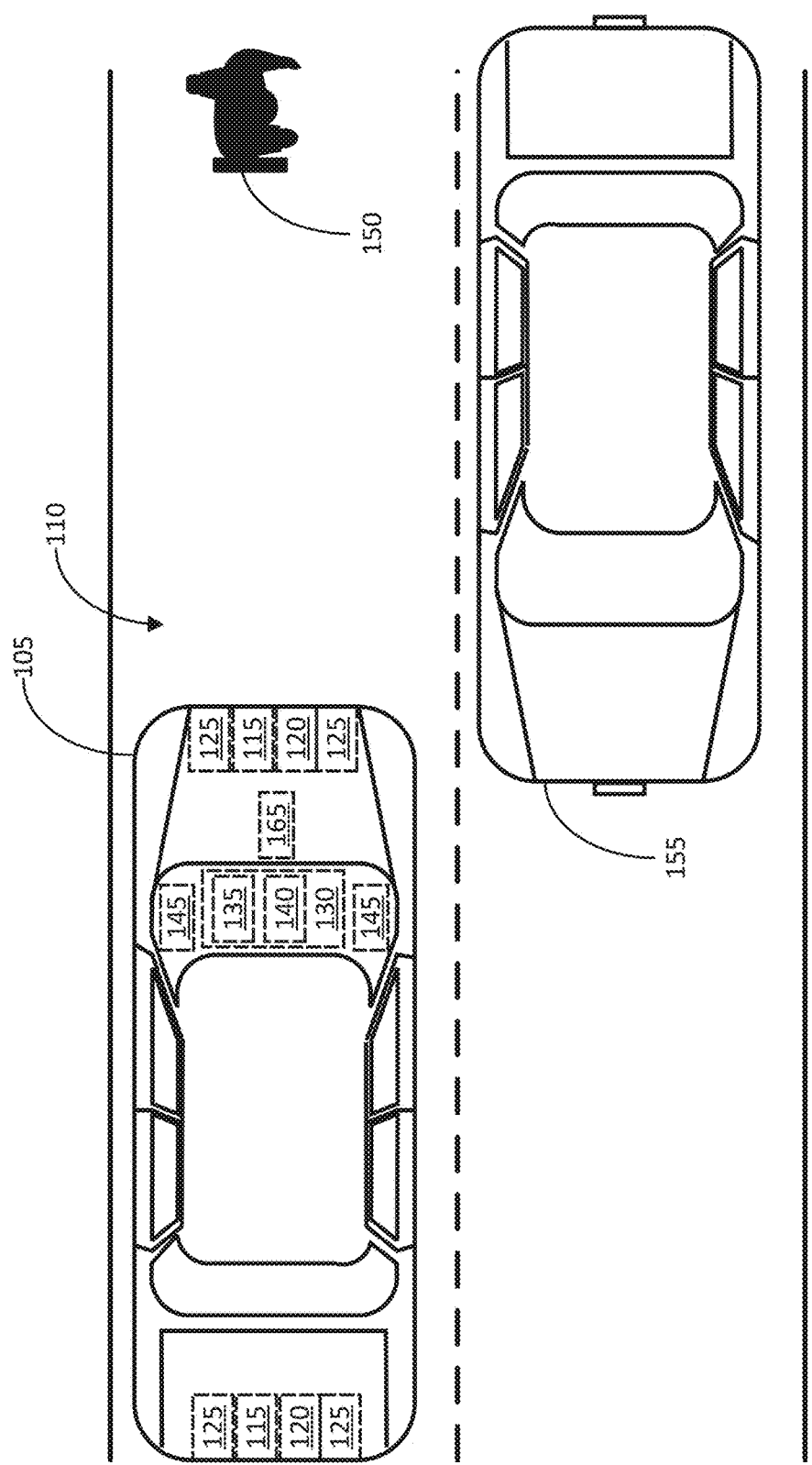
FIG. 1 illustrates an example autonomous vehicle on a roadway, according to various embodiments of the present disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

An "electronic device" or a "computing device" refers to a device that includes a processor and memory. Each device can have its own processor and/or memory, or the processor and/or memory can be shared with other devices as in a virtual machine or container arrangement. The memory contains or receives programming instructions that, when executed by the processor, cause the electronic device to perform one or more operations according to the programming instructions.

The terms "memory," "memory device," "computer-readable storage medium," "data store," "data storage facility" and the like each refer to a non-transitory device on which computer-readable data, programming instructions or both are stored. Except where specifically stated otherwise, the terms "memory," "memory device," "computer-readable storage medium," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "module" refers to a set of computer-readable programming instructions, as executed by a processor, that cause the processor to perform a specified function.

The term "vehicle," or other similar terms, refers to any motor vehicles, powered by any suitable power source, capable of transporting one or more passengers and/or cargo. The term "vehicle" includes, but is not limited to, autonomous vehicles (i.e., vehicles not requiring a human operator and/or requiring limited operation by a human operator), automobiles (e.g., cars, trucks, sports utility vehicles, vans, buses, commercial vehicles, etc.), boats, drones, trains, and the like.

Although exemplary embodiments are described as using a plurality of units to perform the exemplary process, it is understood that the exemplary processes can also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure can be embodied as non-transitory computer readable media on a computer readable medium containing executable programming instructions executed by a processor, controller, or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network-coupled computer systems so that the computer readable media can be stored and executed in a distributed fashion such as, e.g., by a telematics server or a Controller Area Network (CAN).

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value.

Hereinafter, some embodiments of the present disclosure will be described in detail with reference to the drawings. In the drawings, the same reference numerals will be used throughout to designate the same or equivalent elements. In addition, a detailed description of well-known features or functions will be ruled out in order not to unnecessarily obscure the gist of the present disclosure.

Hereinafter, systems and methods for downsampling an image to multiple image resolutions, according to embodiments of the present disclosure, will be described with reference to the accompanying drawings.

Referring now to FIG. 1, an autonomous vehicle 105 on a roadway 110, is illustratively depicted, in accordance with various embodiments of the present disclosure.

According to various embodiments, the vehicle 105 may comprise one or more detection mechanisms/sensors such as, for example, one or more LiDAR sensors 115, one or more radio detection and ranging (RADAR) sensors 120, and one or more image capturing devices e.g., imaging module 125, which may comprise one or more cameras, among other suitable detection mechanisms/sensors. According to various embodiments, the one or more detection mechanisms/sensors can be in electronic communication with one or more computing devices 130. The computing devices 130 can be separate from the one or more detection mechanisms/sensors and/or can be incorporated into the one or more detection mechanisms/sensors. The vehicle 105 may comprise one or more transceivers 165 configured to send and/or receive one or more signals, messages, alerts, etc. According to various embodiments, the one or more transceivers 165 can be coupled to the one or more computing devices 130 and/or can be separate from the one or more computing devices 130.

In the example of FIG. 1, the imaging module 125 is positioned along the vehicle 105 such that the one or more cameras of the imaging module 125 are configured to image all or part of an environment surrounding the vehicle 105. According to various embodiments, the imaging module 125 can be configured to detect one or more objects (e.g., one or more pedestrians 150, vehicles 155, etc.).

In the example of FIG. 1, the vehicle 105 may comprise one or more location detection systems 145 configured to determine a geographic location and/or region at which the vehicle 105 is located. The location detection system 145 can be, e.g., a Global Positioning System (GPS) device and/or other suitable device and/or system for determining geographic location and/or region. According to various embodiments, the one or more location detection systems 145 can be coupled to the one or more computing devices 130 and/or can be separate from the one or more computing devices 130.

According to various embodiments, the computing device 130 may comprise a processor 135 and/or a memory 140. The memory 140 can be configured to store programming instructions that, when executed by the processor 135, can cause the processor 135 to perform one or more tasks such as, e.g., capturing, using a camera, an image depicting an environment within view of the camera, identifying a first section of the image, wherein the first section depicts an area of the environment spaced within a first distance range from the camera, identifying a second section of the image, wherein the second section depicts an area of the environment spaced within a second distance range from the camera, identifying a third section of the image, wherein the third section depicts an area of the environment spaced within a third distance range from the camera, downsampling the first section of the image to a first image resolution, generating a first processed image, downsampling the second section of the image to a second image resolution, generating a second processed image, downsampling the third section of the image to a third image resolution, generating a third processed image, generating a distance map of the environment of the image, prior to downsampling the first section of the image, the second section of the image, and the third section of the image, downsampling the image to an image resolution lower than an original image resolution, and/or other suitable functions.

Figure 2:
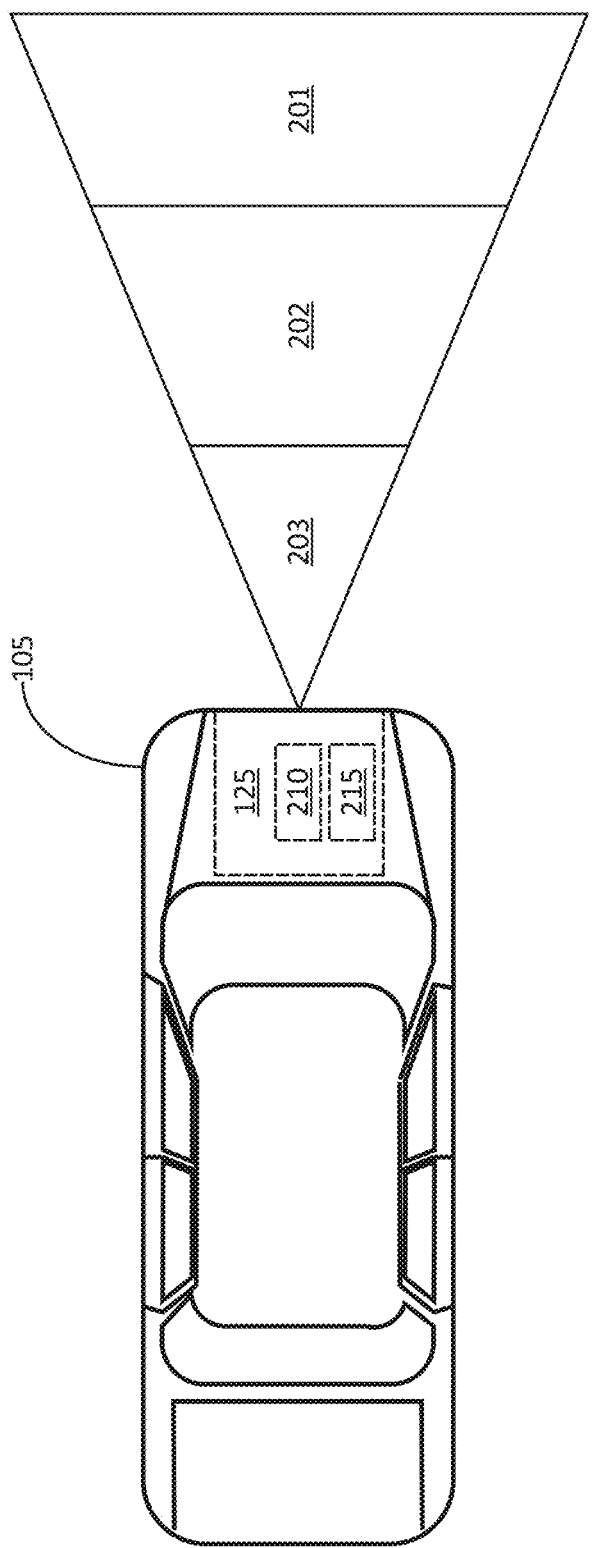
FIG. 2 illustrates the example autonomous vehicle of FIG. 1 with an imaging module and three distance ranges measured from the imaging module of the autonomous vehicle, according to various embodiments of the present disclosure.

Referring now to FIG. 2, the vehicle 105 may comprise the imaging module 125. Components of the vehicle 105 described with respect to FIG. 1, with the exception of the imaging module 125, are removed for clarity. The imaging module 125 can be configured to generate images of the environment of the vehicle 105 using a camera 210 and downsample the images to generate processed images of the environment. In the example of FIG. 2, the imaging module 125 is positioned to capture images of the environment in front of the vehicle 105. The visual range of the imaging module 125 is shown by the intersecting rays that extend from the module. FIG. 2 also shows three distance ranges, a first distance range 201, a second distance range 202, and a third distance range 203. The first distance range 201 is farthest from the imaging module 125, the third distance range 203 is closest to the imaging module, and the second distance range is between the first and the third distance ranges.

The imaging module 125 also may comprise a mapping submodule 215, which is configured to generate a distance map of the environment. For example, a distance map can be a 3D representation of the environment of the vehicle which may comprise one or more objects that have been detected in the environment. For example, the objects may comprise other vehicles, pedestrians, and obstacle such as traffic cones or speedbumps. According to various embodiments, the distance map of the environment may be created using characteristics of the road as the road extends into the distance. According to various embodiments, the road most immediately near the vehicle may extend across a certain percentage of the image. As the road extends into the distance, the percentage the road extends across the image may decrease.

The camera 210 of the imaging module 125 is configured to generate images of the environment of the vehicle 105. In some implementations the imaging module 125 may comprise other types of image capturing technology, such as LiDAR and RADAR.

The imaging module 125 is configured to generate images using the camera 210 and further configured to downsample the generated images. As used in this specification, downsampling refers to reducing the number of pixels in an image. The imaging module 125 can also crop the generated images, that is, select a portion of the image that is smaller than the original image, and generate a processed image that may comprise only the selected portion. The downsampled and/or processed images can then be sent to other components of the vehicle 105, such as the processor 135. One particular advantage of downsampling an image is that the downsampled image has less data than the original image from which it is generated, and therefore the downsampled image can be processed more quickly by a computer. In applications such as autonomous vehicles, where processing times must be kept below certain thresholds to ensure the vehicle functions effectively, downsampling an image can ensure an operational processing time.

In the example of FIG. 2, the imaging module 125 is placed at the front of the vehicle 105 to capture images of the environment the vehicle will encounter as it moves forward, although in other implementations one or more imaging modules may be placed in other locations to capture different views of the vehicle's environment.

Figure 4:
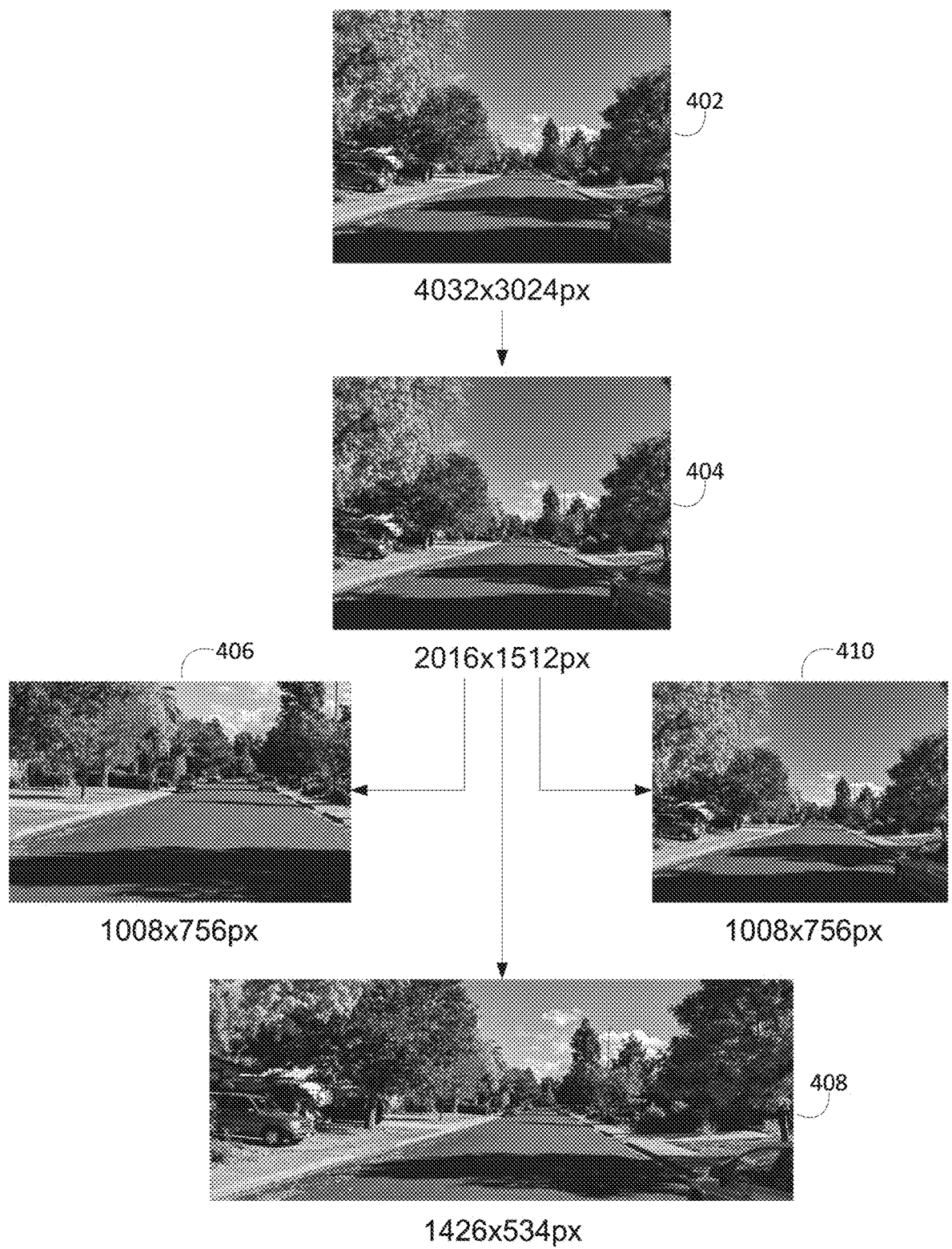
FIG. 4 is an example block diagram showing an image and downsampled, cropped versions of the image, according to various embodiments of the present disclosure.

Referring now to FIGS. 3 and 4, respectively, a flowchart 300 of an example method for generating processed images and a block diagram showing an image and downsampled, cropped versions of the image is provided. The method of flowchart 300 is described as being performed by an example system; for example, the imaging module 125 can be configured to perform the method.

At 302, the system captures an image, using a camera, depicting an environment within view of the camera. For example, when the system is part of an autonomous vehicle, the environment captured by the camera can be the area in front of the vehicle. FIG. 4 comprises an image 402 with an example image resolution of 4032×3024 pixels.

For example, if the vehicle is stopped at an intersection, the captured image may comprise cars that are in front of the vehicle, a stoplight suspended from a pole that extends into the middle of the intersection, and cars that are across the intersection. As another example, if the vehicle is driving from one stop sign to another, the image may comprise the closer stop sign, the farther stop sign, and various objects between the two signs, such as pedestrians on a sidewalk or cars parked along the side of the road. That is, the image may comprise objects that are relatively close and far from the camera.

By way of example, if the vehicle is traveling down an interstate, multiple lanes and lane lines may be visible in the image. The relative lengths of the lane lines and the convergence of the lane lines into the distance in the image may further define distances to different portions of the image.

The system can downsample an image or sections of an image, as described in greater detail below with respect to stages 310-314. In some implementations, prior to downsampling sections of an image, the system downsamples the image to an image resolution lower than an original image resolution. This can be advantageous because downsampling the image to a lower resolution results in a downsampled image having less data than the original image, and therefore processing of the downsampled image can be performed in less time than processing of the original image. According to various embodiments, downsampling may be processed on chip in the camera or processed in a computational module that may also be configured to receive additional sensor data from other sensors. By processing the image on the chip, the image may be transmitted with smaller pixel size, which may then be transmitted more quickly from the camera to the computational module of the vehicle. For example, FIG. 4, comprises a downsampled image 404, which is a downsampled version of the image 402. While the image 402 has a resolution of 4032×3024 pixels, the downsampled image 404 has a resolution of 2016×1512 pixels.

At 304, the system identifies a first section of the image. The first section depicts an area of the environment spaced within a first distance range from the camera. That is, the first section of the image is a portion of the image that shows an area corresponding to the first distance range. The first distance range can be an area that is relatively far from the camera, as illustrated by the first distance range 201 of FIG. 2. Following the example above of a vehicle stopped at an intersection, the first section of the image may comprise the objects that are relatively far from the vehicle, such as the cars that are across the intersection.

While the system identifies sections of the image that may comprise objects in the environment of the camera, the system need not use objects in the environment to determine the sections. The system can identify the first or other sections of the image using any technology capable of estimating distances between points, regardless of particular objects present in the environment. For example, the system can use LiDAR, RADAR, monocular distancing, and/or binocular distancing technology to estimate a distance between two points in space.

At 306, the system identifies a second section of the image. The second section depicts an area of the environment spaced within a second distance range from the camera. For example, while the first distance range can be an area that is relative far from the camera, the second distance range can be an area that is closer to the camera than the first distance range, as illustrated by the second distance range 202 of FIG. 2. Following the example above of a vehicle stopped at an intersection, the second section of the image may comprise the objects that are closer than those objects in the first distance range, such as the streetlight suspended from a pole in the intersection.

At 308, the system identifies a third section of the image. The third section depicts an area of the environment spaced within a third distance range from the camera. For example, the third distance range can be an area that is closest to the camera, as illustrated by the third distance range 203 of FIG. 2. Following the example above of a vehicle stopped at an intersection, the third section of the image may comprise the cars in front of the vehicle.

In some implementations, the system can generate a distance map of the environment of the image. Generating the distance map can be performed using LiDAR, RADAR, image analysis, or a combination of these technologies. For example, the system can identify one or more objects in the image and determine their distances using the relative sizes of the objects. After generating the distance map, the system can use the map to identify the first, second, and third sections of the image.

The system can determine the first, second, and third sections of the image based on which portion of the image may be most relevant to an autonomous vehicle. For example, for certain distance ranges, e.g., distance ranges that are relatively close to an autonomous vehicle, the system can be programmed to process full, unprocessed images because the speed and direction of the vehicle is such that it will enter the relatively close distance range soon. Therefore, it may be advantageous for the system to process unprocessed images which comprise more information about the environment when compared to the information contained in a processed image.

According to various embodiments, the system may be configured to downsample near field portions of the image as the portions of the image that may be taken up by other vehicles or objects in the driving path and may be relatively larger in the near field and therefore may be identified at much lower resolutions.

In contrast, for other distance ranges, e.g., distance ranges that are relatively far from an autonomous vehicle, the system can be programmed to process processed images because the system can operate effectively by processing less information from a processed image of the relative far distance range compared to more information from an unprocessed image of the same range as that information may not be relevant to the autonomous driving at the moment the image is taken.

At 310, the system downsamples the first section of the image to a first image resolution, generating a first processed image. After identifying the first section of the image, the system can generate a cropped version of the image that shows only the first section of the image. In some implementations, the first processed image may be generated by cropping a downsampled version of the image. In the example of FIG. 4, a first processed image 406 is a cropped version of the downsampled image 404. The first processed image 406, is therefore a downsampled, cropped version of the image 402. That is, the processed image 406 shows only the portion of the images 402 and 404 that corresponds to the first section identified in stage 304. A downsampled image can have a reduced number of pixels and therefore a different resolution when compared to an original image. In the example of FIG. 4, while the image 402 has an image resolution of 4032×3024 pixels, the first processed image 406 has an image resolution of 1008×756 pixels.

In some implementations, the camera 210 of the imaging module 125 can perform the process of downsampling an image to a certain resolution to generate a processed image, for example, a camera of the imaging module 125 can include a processor that performs the downsampling. In some implementations, the downsampling can be performed by a processor, such as the processor 135, while in some implementations, the downsampling can be performed remotely, e.g., using cloud computing.

At 312, the system downsamples the second section of the image to a second image resolution, generating a second processed image, and at 314 the system downsamples the third section of the image to a third image resolution, generating a third processed image. In some implementations, the second processed image and the third processed image are generated by cropping a downsampled version of the image. In the example of FIG. 4, a second processed image 408 and the third processed image 410 are cropped versions of the downsampled image 404. The process of downsampling the image to generate a second and third processed image is approximately the same as the process described above with respect to 310, except that the image resolutions of the second and third processed images may be different from the image resolution of the first processed image. For example, the second image resolution can be greater than one or both of the first image resolution and the third image resolution.

Resolutions and dimensions other than those shown in the example of FIG. 4 are possible. In some implementations, the system can generate the first processed image from an original image according to the following specifications. The first processed image can be a center-cropped version of the original image, e.g., it can show a group of pixels at the center of the original image. The first processed image can be half the width and half the height of the original image, and it can have the same resolution as the original image. When compared to the original image, the first processed image may comprise one-quarter of the original image data or one-eighth of the sensor data of the original image.

In some implementations, the system can generate the second processed image from an original image according to the following specifications. The second processed image can be a vertical center-cropped version of the original image, e.g., it can be the width of the original image and half height of the original image. The second processed image can be half the resolution as the original image. When compared to the original image, the second processed image may comprise one-quarter of the original image data or one-eighth of the sensor data of the original image.

In some implementations, the system can generate the third processed image from an original image according to the following specifications. The third processed image can be an uncropped version of the original image. The third processed image can be a quarter of the resolution of the original image. When compared to the original image, the second processed image may comprise one-quarter of the original image data or one-eighth of the sensor data of the original image.

In yet other implementations, the system can determine a resolution and/or a dimension for a processed image based at least in part on the angle of the camera relative to a level plane or on the difference in elevations between the camera and one of the first, second, or third distance ranges. For example, the system can identify a higher or lower section of an image, that is, a section of the image that is at higher or lower elevation compared to an elevation of the camera. The system can then determine a resolution or dimension for the higher or lower section of the image, and then generate a processed image corresponding to the determined resolution or dimension.

For example, the higher section of an image can be a portion that shows an uphill area, while the lower section of an image can be a portion that shows a downhill area. The resolution for a processed image that corresponds to the higher or lower section of the image can be lower than the resolution for the first processed image. The dimension for a processed image that corresponds to the higher or lower section of the image can be half the height or half the width of an original image.

Changing the resolution and/or dimension of the image based on camera angle or elevation may be advantageous because an autonomous vehicle system may be able to reduce processing time for processed images that show higher or lower sections, if those processed images have a lower resolution and/or a smaller dimension compared to an original image.

According to various embodiments, on a flat surface, the width of the road in front of the vehicle may look progressively smaller until it ends at a point on the horizon. The relative width of the road may be used to determine how far away that part of the picture is from the current position. On an incline, the width of the road may not taper off as fast. If the incline is known, the incline information may be used to calculate distance to the points in the picture and determine how to downsample based on incline information in addition to the other information used for downsampling.

Figure 5:
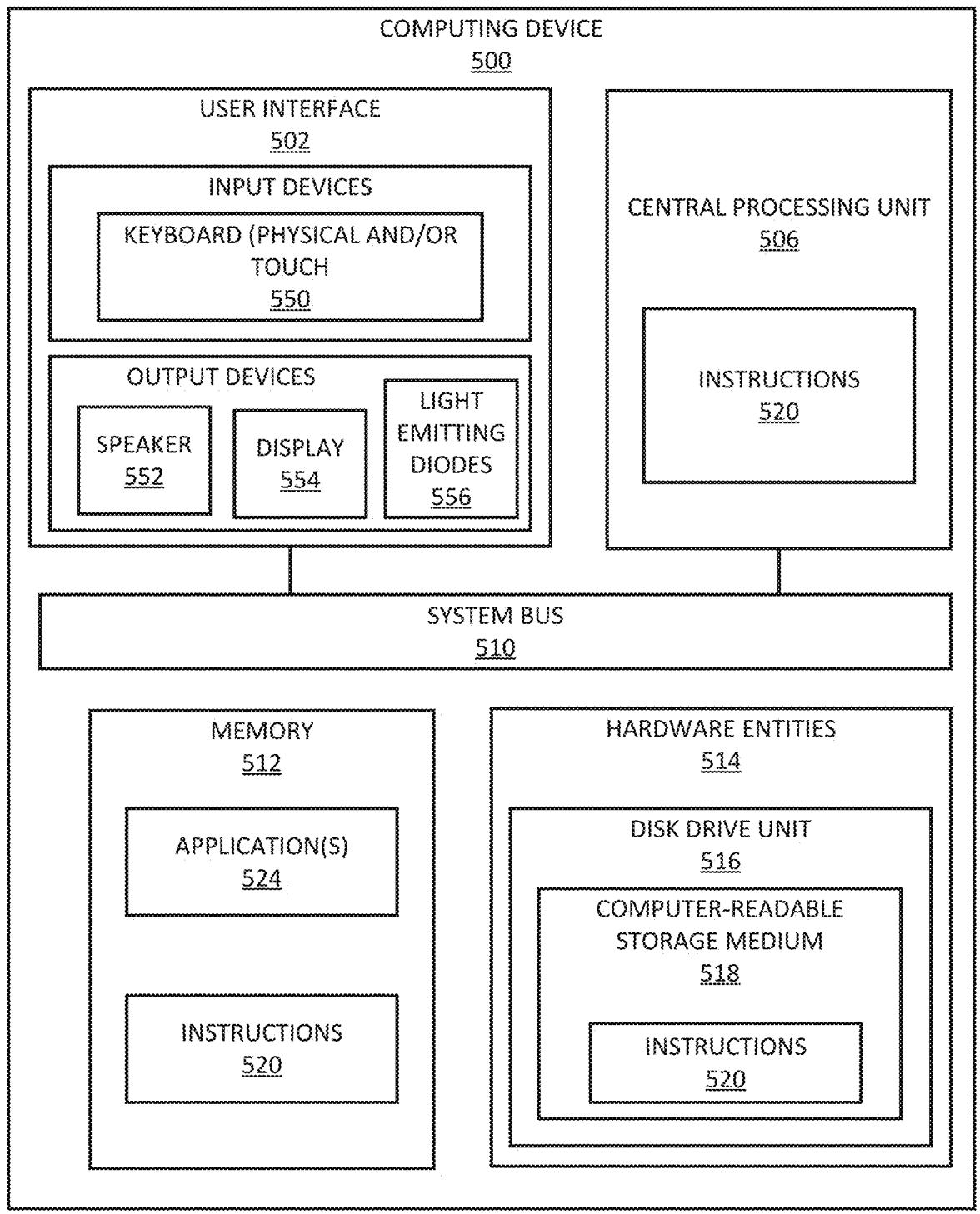
FIG. 5 illustrates example elements of a computing device, according to various embodiments of the present disclosure.

Referring now to FIG. 5, an illustration of an example architecture for a computing device 500 is provided. The computing device 130 of FIG. 1 can be the same as or similar to computing device 500. As such, the discussion of computing device 500 is sufficient for understanding the computing device 130 of FIG. 1, for example.

Computing device 500 may comprise more or less components than those shown in FIG. 1. The hardware architecture of FIG. 5 represents one example implementation of a representative computing device configured to one or more methods and means for identifying a vehicle subject to an emergency alert, as described herein. As such, the computing device 500 of FIG. 5 implements at least a portion of the method(s) described herein (for example, method 300 of FIG. 3).

Some or all components of the computing device 500 can be implemented as hardware, software and/or a combination of hardware and software. The hardware may comprise, but is not limited to, one or more electronic circuits. The electronic circuits may comprise, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 5, the computing device 500 may comprise a user interface 502, a Central Processing Unit ("CPU") 506, a system bus 510, a memory 512 connected to and accessible by other portions of computing device 500 through system bus 510, and hardware entities 514 connected to system bus 510. The user interface may comprise input devices and output devices, which facilitate user-software interactions for controlling operations of the computing device 500. The input devices may comprise, but are not limited to, a physical and/or touch keyboard 550. The input devices can be connected to the computing device 500 via a wired or wireless connection (e.g., a Bluetooth® connection). The output devices may comprise, but are not limited to, a speaker 552, a display 554, and/or light emitting diodes 556.

At least some of the hardware entities 514 perform actions involving access to and use of memory 512, which can be a Random Access Memory (RAM), a disk driver and/or a Compact Disc Read Only Memory (CD-ROM), among other suitable memory types. Hardware entities 514 may comprise a disk drive unit 516 comprising a computer-readable storage medium 518 on which is stored one or more sets of instructions 520 (e.g., programming instructions such as, but not limited to, software code) configured to implement one or more of the methodologies, procedures, or functions described herein. The instructions 520 can also reside, completely or at least partially, within the memory 512 and/or within the CPU 506 during execution thereof by the computing device 500. The memory 512 and the CPU 506 also can constitute machine-readable media. The term "machine-readable media", as used here, can refer to a single medium or multiple media (e.g., a centralized or distributed database, and/or associated caches and servers) that store the one or more sets of instructions 520. The term "machine-readable media", as used here, also can refer to any medium that is capable of storing, encoding or carrying a set of instructions 520 for execution by the computing device 500 and that cause the computing device 500 to perform any one or more of the methodologies of the present disclosure.

Figure 6:
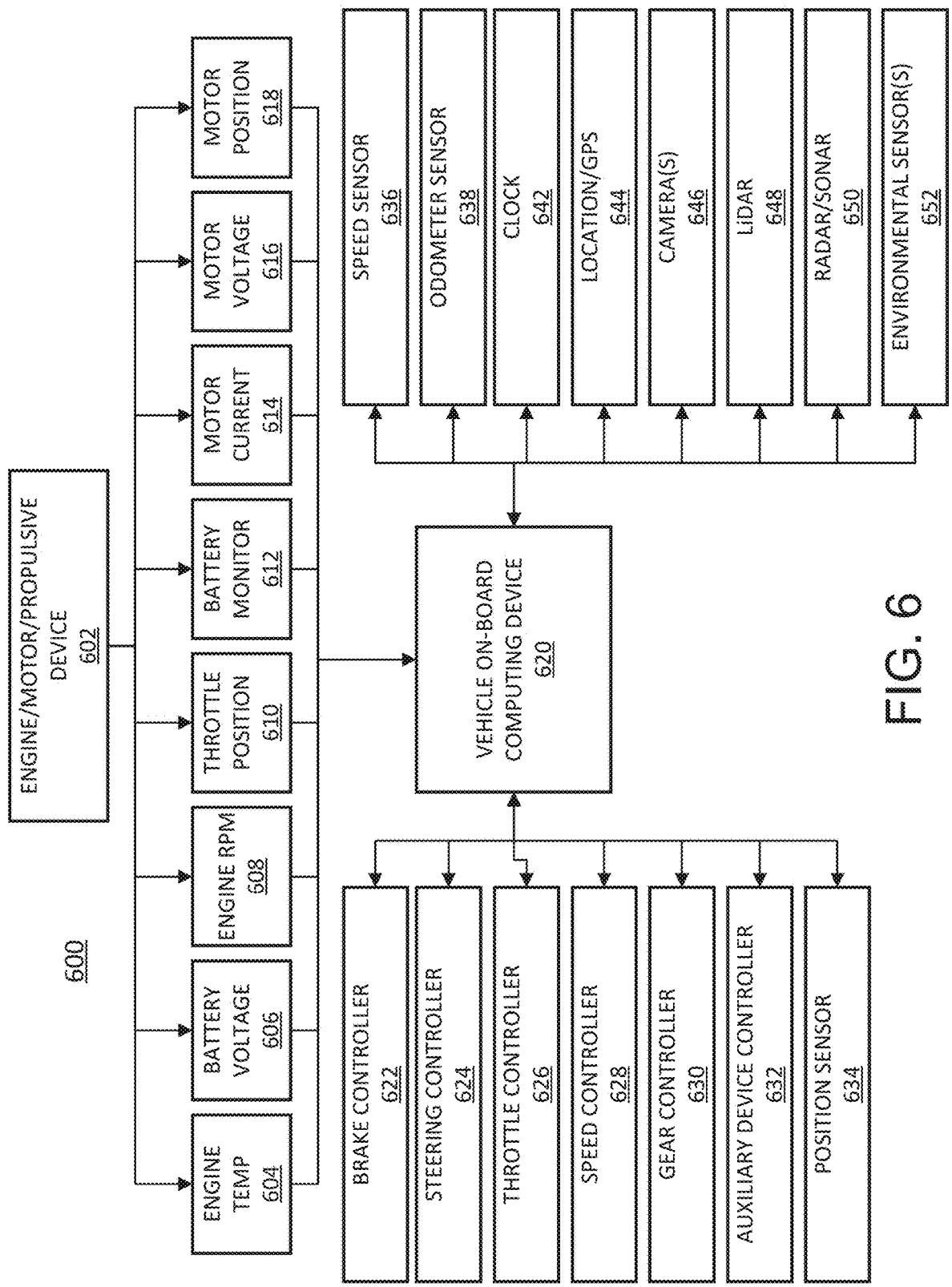
FIG. 6 illustrates an example architecture of a vehicle, according to various embodiments of the present disclosure.

Referring now to FIG. 6, an example vehicle system architecture 600 for a vehicle is provided, in accordance with various embodiments of the present disclosure.

Vehicle 105 of FIG. 1 can have the same or similar system architecture as that shown in FIG. 6. Thus, the following discussion of the vehicle system architecture 600 is sufficient for understanding the vehicle 105 FIG. 1.

As shown in FIG. 6, the vehicle system architecture 600 may comprise an engine, motor or propulsive device (e.g., a thruster) 602 and various sensors 604-618 for measuring various parameters of the vehicle system architecture 600. In gas-powered or hybrid vehicles having a fuel-powered engine, the sensors 604-618 may comprise, for example, an engine temperature sensor 604, a battery voltage sensor 606, an engine Rotations Per Minute (RPM) sensor 608, and/or a throttle position sensor 610. If the vehicle is an electric or hybrid vehicle, then the vehicle can have an electric motor, and accordingly will have sensors such as a battery monitoring system 612 (to measure current, voltage and/or temperature of the battery), motor current 614 and voltage 616 sensors, and motor position sensors such as resolvers and encoders 618.

Operational parameter sensors that are common to both types of vehicles may comprise, for example: a position sensor 634 such as an accelerometer, gyroscope and/or inertial measurement unit; a speed sensor 636; and/or an odometer sensor 638. The vehicle system architecture 600 also can have a clock 642 that the system uses to determine vehicle time during operation. The clock 642 can be encoded into the vehicle on-board computing device 620, it can be a separate device, or multiple clocks can be available.

The vehicle system architecture 600 also may comprise various sensors that operate to gather information about the environment in which the vehicle is traveling. These sensors may comprise, for example: a location sensor 644 (for example, a Global Positioning System (GPS) device), such as, e.g., location detection system 145 in FIG. 1; object detection sensors such as one or more cameras 646; a LIDAR sensor system 648; and/or a radar and/or a sonar system 650. The sensors also may comprise environmental sensors 652 such as a precipitation sensor and/or ambient temperature sensor The object detection sensors can enable the vehicle system architecture 600 to detect objects that are within a given distance range of the vehicle 105 in any direction, while the environmental sensors 652 collect data about environmental conditions within the vehicle's area of travel.

During operations, information is communicated from the sensors to an on-board computing device 620. The on-board computing device 620 can be configured to analyze the data captured by the sensors and/or data received from data providers, and can be configured to optionally control operations of the vehicle system architecture 600 based on results of the analysis. For example, the on-board computing device 620 can be configured to control: braking via a brake controller 622; direction via a steering controller 624; speed and acceleration via a throttle controller 626 (in a gas-powered vehicle) or a motor speed controller 628 (such as a current level controller in an electric vehicle); a differential gear controller 630 (in vehicles with transmissions); and/or other controllers.

Geographic location information can be communicated from the location sensor 644 to the on-board computing device 620, which can then access a map of the environment that corresponds to the location information to determine known fixed features of the environment such as streets, buildings, stop signs and/or stop/go signals. Captured images from the cameras 646 and/or object detection information captured from sensors such as LiDAR 648 is communicated from those sensors to the on-board computing device 620. The object detection information and/or captured images are processed by the on-board computing device 620 to detect objects in proximity to the vehicle. Any known or to be known technique for making an object detection based on sensor data and/or captured images can be used in the embodiments disclosed in this document.

The features and functions described above, as well as alternatives, can be combined into many other different systems or applications. Various alternatives, modifications, variations or improvements can be made by those skilled in the art, each of which is also intended to be encompassed by the disclosed embodiments.

The invention claimed is:

1. A method of downsampling an image to a plurality of image resolutions, comprising:

capturing, using a camera, an image depicting an environment within view of the camera;
identifying a first section of the image, wherein the first section depicts an area of the environment spaced within a first distance range from the camera;
identifying a second section of the image, wherein the second section depicts an area of the environment spaced within a second distance range from the camera;
identifying a third section of the image, wherein the third section depicts an area of the environment spaced within a third distance range from the camera;
determining a first image resolution for a first processed image, a second image resolution for a second processed image, and a third image resolution for a third processed image based on (i) an angle of the camera relative to a level plane, (ii) a difference in elevations between the camera and each of the first, second or third distance range, and/or (iii) an incline of a road shown in the image, wherein the first distance range, the second distance range, and the third distance range pertain to distance ranges of a driving surface; and
downsampling:
the first section of the image to the first image resolution, generating the first processed image;
the second section of the image to the second image resolution, generating the second processed image; and
the third section of the image to the third image resolution, generating the third processed image,
wherein:
the first distance range is farther from the camera than the second distance range, and
the first image resolution is less than the second image resolution, and the second image resolution being different than the third image resolution.

2. The method of claim 1, wherein the first distance range, the second distance range, and the third distance range do not overlap.

3. The method of claim 1, wherein the second distance range is:
closer to the camera than the first distance range; and
farther from the camera than the third distance range.

4. The method of claim 1, further comprising generating a distance map of the environment of the image.

5. The method of claim 4, wherein the generating the distance map is performed using one or more of the following:
LiDAR;
RADAR; and
image analysis.

6. The method of claim 4, wherein one or more of the following are based on the distance map:
the identifying the first section;
the identifying the second section; and
the identifying the third section.

7. The method of claim 1, wherein:
the downsampling is performed using a processor, and
the camera comprises the processor.

8. The method of claim 1, further comprising, prior to downsampling the first section of the image, the second section of the image, and the third section of the image:
downsampling the image to an image resolution lower than an original image resolution.

9. The method of claim 1, wherein the second image resolution is greater than:
the first image resolution; and
the third image resolution.

10. The method of claim 1, wherein:
the first distance range is farther from the one or more cameras than the second distance range and the third distance range, and
the first image resolution is less than the second image resolution and the third image resolution.

11. The method of claim 1, wherein
the first processed image comprises a center cropped version of the image,
the second processed image comprises a vertical center-cropped version of the image, and
the third processed image comprises an uncropped version of the image.

12. A system for downsampling an image to a plurality of image resolutions, comprising:
a vehicle; and
an imaging module, coupled to the vehicle, the imaging module comprising:
one or more cameras, configured to capture an image depicting an environment within view of the one or more cameras; and
a processor, configured to:
identify:
a first section of the image depicting an area of the environment spaced within a first distance range from the one or more cameras;
a second section of the image depicting an area of the environment spaced within a second distance range from the one or more cameras; and
a third section of the image depicting an area of the environment spaced within a third distance range from the one or more cameras;
determine a first image resolution for a first processed image, a second image resolution for a second processed image, and a third image resolution for a third processed image based on (i) an angle of the camera relative to a level plane, (ii) a difference in elevations between the camera and each of the first, second or third distance range, and/or (iii) an incline of a road shown in the image, wherein the first distance range, the second distance range, and the third distance range pertain to distance ranges of a driving surface; and
downsample:
the first section of the image to the first image resolution, generating the first processed image;
the second section of the image to the second image resolution, generating the second processed image; and
the third section of the image to the third image resolution, generating the third processed image,
wherein:
the first distance range is farther from the one or more cameras than the second distance range, and
the first image resolution is less than the second image resolution.

13. The system of claim 12, wherein the first distance range, the second distance range, and the third distance range do not overlap.

14. The system of claim 12, wherein the second distance range is:
closer to the one or more cameras than the first distance range; and
farther from the one or more cameras than the third distance range.

15. The system of claim 12, wherein the processor is further configured to generate a distance map of the environment of the image.

16. The system of claim 15, wherein the generating the distance map is performed using one or more of the following:
LiDAR;
RADAR; and
image analysis.

17. The system of claim 15, wherein one or more of the following are based on the distance map:
the identifying the first section;
the identifying the second section; and
the identifying the third section.

18. The system of claim 12, wherein the one or more cameras comprise the processor.

19. The system of claim 12, wherein the processor is further configured to, prior to downsampling the first section of the image, the second section of the image, and the third section of the image:
downsample the image to an image resolution lower than an original image resolution.

20. The system of claim 12, wherein the second image resolution is greater than:
the first image resolution; and
the third image resolution.

21. A system, comprising:
an imaging device including one or more cameras, the imaging device coupled to a vehicle,
wherein the one or more cameras are configured to capture an image depicting an environment within view of the one or more cameras; and
a computing device, including a processor and a memory, coupled to the vehicle, configured to store programming instructions that, when executed by the processor, cause the processor to:
identify:
a first section of the image depicting an area of the environment spaced within a first distance range from the one or more cameras;
a second section of the image depicting an area of the environment spaced within a second distance range from the one or more cameras; and
a third section of the image depicting an area of the environment spaced within a third distance range from the one or more cameras;
determine a first image resolution for a first processed image, a second image resolution for a second processed image, and a third image resolution for a third processed image based on (i) an angle of the camera relative to a level plane, (ii) a difference in elevations between the camera and each of the first, second or third distance range, and/or (iii) an incline of a road shown in the image, wherein the first distance range, the second distance range, and the third distance range pertain to distance ranges of a driving surface; and
downsample:
the first section of the image to the first image resolution, generating the first processed image;
the second section of the image to the second image resolution, generating the second processed image; and
the third section of the image to the third image resolution, generating the third processed image,
wherein:
the first distance range is farther from the one or more cameras than the second distance range, and
the first image resolution is less than the second image resolution.

\* \* \* \* \*